(12) United States Patent
Pihl et al.

(10) Patent No.: US 11,955,892 B2
(45) Date of Patent: Apr. 9, 2024

(54) HIGH-SIDE POWER SWITCH FOR ISOLATING A LOAD IN A WELLBORE

(71) Applicant: Halliburton Energy Services, Inc., Houston, TX (US)

(72) Inventors: Joachim Pihl, Sandefjord (NO); Rodrigo de Carvalho Mendez, Rio de Janeiro (BR)

(73) Assignee: Halliburton Energy Services, Inc., Houston, TX (US)

(*) Notice: Subject to any disclaimer, the term of this patent is extended or adjusted under 35 U.S.C. 154(b) by 127 days.

(21) Appl. No.: 17/553,768

(22) Filed: Dec. 16, 2021

(65) Prior Publication Data

US 2023/0198410 A1 Jun. 22, 2023

(51) Int. Cl.
*H02M 3/335* (2006.01)

(52) U.S. Cl.
CPC ....... *H02M 3/335* (2013.01); *H02M 3/33507* (2013.01)

(58) Field of Classification Search
CPC .......................... H02M 3/335; H02M 3/33507
See application file for complete search history.

(56) References Cited

U.S. PATENT DOCUMENTS

| | | | |
|---|---|---|---|
| 6,046,685 A | 4/2000 | Tubel | |
| 8,923,095 B2 | 12/2014 | Pettersen et al. | |
| 9,856,722 B2 | 1/2018 | Dong et al. | |
| 10,362,644 B1* | 7/2019 | Xiong | H05B 45/59 |
| 10,711,597 B2 | 7/2020 | Wheeler et al. | |
| 10,927,663 B2 | 2/2021 | Williamson et al. | |
| 11,313,206 B2* | 4/2022 | Fripp | E21B 43/12 |
| 2010/0061125 A1* | 3/2010 | Ikezawa | H02M 3/33507 363/21.12 |
| 2011/0068819 A1* | 3/2011 | Sims | G01R 31/40 324/691 |
| 2011/0110122 A1* | 5/2011 | Chen | H02M 3/33592 363/21.13 |
| 2013/0043048 A1 | 2/2013 | Joseph | |
| 2017/0040994 A1 | 2/2017 | Chen | |
| 2017/0149339 A1* | 5/2017 | Kawashima | H02M 3/33515 |
| 2017/0187200 A1* | 6/2017 | Somerville | H02J 7/02 |
| 2018/0145677 A1 | 5/2018 | Handy et al. | |

(Continued)

FOREIGN PATENT DOCUMENTS

| | | |
|---|---|---|
| CN | 105429119 | 3/2016 |
| EP | 0736959 A1 | 10/1996 |

(Continued)

OTHER PUBLICATIONS

Kashyap et al., "Silicon Carbide Integrated Circuits for Extreme Environments", Conference: Wide Bandgap Power Devices and Applications (WiPDA), IEEE Workshop, Oct. 2013, 4 pages.

(Continued)

*Primary Examiner* — Kyle J Moody
(74) *Attorney, Agent, or Firm* — Kilpatrick Townsend & Stockton LLP

(57) ABSTRACT

A system that includes a first transistor to provide a drive voltage to a coupled inductor is disclosed. The coupled inductor can receive the drive voltage and generate a voltage output. A second transistor can receive a switching voltage generated from the voltage output to isolate a load positionable downhole in a wellbore from a voltage source.

20 Claims, 7 Drawing Sheets

(56) References Cited

U.S. PATENT DOCUMENTS

2019/0044574 A1   2/2019  Majid
2019/0235007 A1   8/2019  Williamson et al.

FOREIGN PATENT DOCUMENTS

EP        3289176        5/2019
JP        2012170244 A   9/2012
WO        2015142988     9/2015

OTHER PUBLICATIONS

PCT App. No. PCT/US2021/063928, "International Search Report and Written Opinion", dated Sep. 7, 2022, 9 pages.

* cited by examiner

US 11,955,892 B2

1

HIGH-SIDE POWER SWITCH FOR ISOLATING A LOAD IN A WELLBORE

TECHNICAL FIELD

The present disclosure relates generally to wellbore operations and, more particularly (although not necessarily exclusively), to a high-side power switch operable downhole in a wellbore.

BACKGROUND

Hydrocarbons, such as oil and gas, can be extracted from subterranean formations that may be located onshore or offshore. Hydrocarbons can be extracted through a wellbore formed in the subterranean formation. Wellbore operations for extracting the hydrocarbons can include drilling operations, completion operations, and production operations. Some or all of these wellbore operations may involve electronic elements located downhole that utilize a high-voltage source to operate. Due to harsh downhole conditions, the electronic elements may perform sub-optimally. For example, the electronic elements may short circuit or experience other electrical faults. As a result, the electronic elements may be damaged, which may be time and cost intensive to fix or replace. In some instances, an entire downhole system can be functionally degraded or lost due to a malfunction.

DETAILED DESCRIPTION

Figure 1:
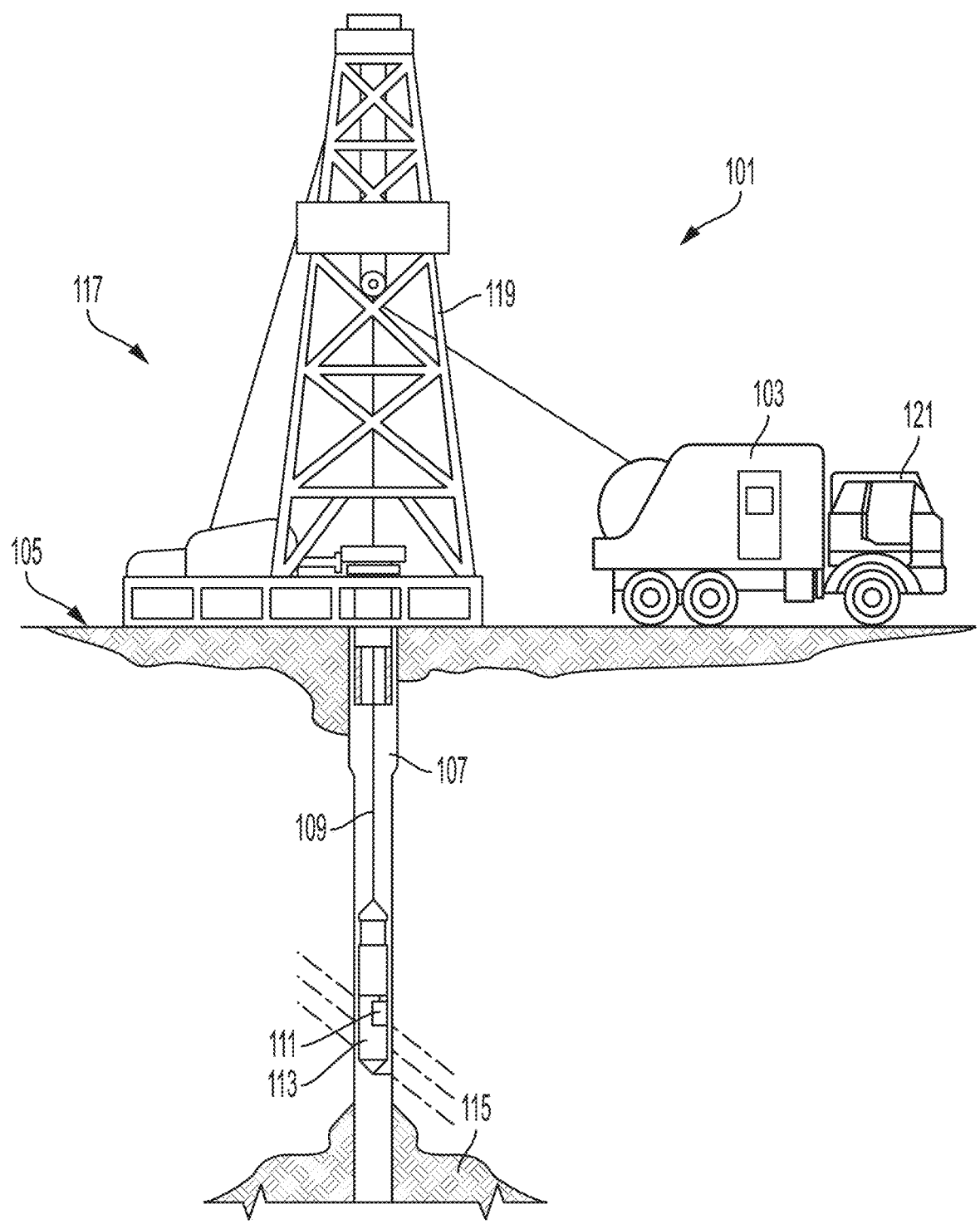
FIG. 1 is a cross-sectional view of a wellbore servicing system with which a power switch can be used for isolating a load according to one example of the present disclosure.

Certain aspects and examples of the present disclosure relate to using a high-side power switch, in combination with a forward converter or flyback converter, to isolate a load downhole in a wellbore. Generally, power switches that are high-side power switches can be positioned between a voltage source and a load. Power switches that are low-side power switches, in contrast, can be positioned between any given load and a path to ground. A circuit with a coupled inductor can, through a primary and a secondary winding, transfer energy from a corresponding primary circuit to a corresponding secondary circuit. The coupled inductor may be configured as part of a forward converter or flyback converter if the circuit transfers energy to the secondary circuit when the primary circuit is providing a switching effect to the primary winding. By using a high-side power switch in a wellbore, a load such as a load that is malfunctioning may be isolated to prevent spread of faults.

A high-side power switch that can be deployed downhole in a wellbore may use one or more transistors, such as N-channel metal oxide semiconductor field-effect transistors (NMOSs). NMOSs can exhibit low resistance. NMOSs can be switched by positive voltage, meaning NMOSs can be switched by electron flow. Electron flow can be a high mobility mode of switching, which can exhibit a low electrical resistance. By exhibiting low resistance, NMOSs can generate less heat. Additionally, the NMOS may be made from silicon carbide, which can have a thin drift layer with a high impurity concentration. The thin drift layer may allow the NMOS to withstand greater voltages or higher temperatures. As a result, the high-side power switch that includes the NMOS can be used in high-temperature, high-voltage applications.

Alternatively, insulated-gate bipolar transistors (IGBTs) may be an example of the one or more transistors used in the high-side power switch. IGBTs can handle large collector-emitter currents with small gate current drive. IGBTs can be made from silicon carbide as well. Other examples of the one or more transistors of the high-side switch may be a junction-gate field-effect transistor (JFET) cascaded with a switching device or any type of switching device that can be used as a bypass element.

To avoid a fault spreading along a downhole power grid to other devices, a high-side power switch can isolate a singular connection of electronic devices that may be present in a wellbore zone. To command the switch, the high-side power switch can be a circuit with a half-wave rectifier and a coupled inductor. The circuit can also include a first transistor, a second transistor, a diode, a coupled inductor, resistors, and a capacitor. An example of the coupled inductor can be a transformer.

Usage of the high-side power switch can provide safety and reliability to a project since the high-side power switch can diminish risks related to a device fault. The high-side power switch may prevent damage caused by short circuits from a production zone, protecting a remaining part of a downhole power grid.

The circuit can be split into two parts: a driver stage and a power switch stage. The driver stage can connect to the primary winding. The driver stage can drive the coupled inductor. The driver stage can use a low voltage square wave to drive a first transistor that can switch a drive voltage source into the primary winding, which can create a pulsed voltage output on the secondary winding. The first transistor can be any of the abovementioned examples of transistors or switching devices. The first transistor can also be a bipolar junction transistor (BJT).

The power switch stage can connect to the secondary winding. The power switch stage can rectify and filter a voltage output of the coupled inductor, which can create a floating gate-source or emitter voltage to turn a power switch on. The voltage output of the coupled inductor can be rectified by the diode, then filtered and sustained by the capacitor. Since this filtered voltage can be floating, it can be applied to a second transistor, which may turn the second transistor on. The second transistor can connect a high-voltage source to the load downhole. As a result, the second transistor can be used as a high-side power switch because the floating gate-source or emitter voltage is referenced to a source or emitter potential. A leakage resistor may discharge the capacitor and a gate of the second transistor to decrease turn-off time of the second transistor.

These illustrative examples are given to introduce the reader to the general subject matter discussed here and are not intended to limit the scope of the disclosed concepts. The following sections describe various additional features and examples regarding the drawings in which like numerals indicate like elements, and directional descriptions are used to describe the illustrative examples but, like the illustrative examples, should not be used to limit the present disclosure. The elements included in the illustrations herein may not be drawn to scale.

FIG. 1 is a cross-sectional view of a wellbore servicing system 101 according to one example of the present disclosure. While FIG. 1 generally depicts a land-based operation, other applications can include subsea operations that employ floating or sea-based platforms and rigs.

In the present example, the wellbore servicing system 101 includes a wellbore 107 penetrating a subterranean formation 115 for recovering hydrocarbons, storing hydrocarbons, disposing of carbon dioxide, or the like. The wellbore 107 can be drilled into a subterranean formation 115 using any suitable drilling technique. While shown as extending vertically from a surface 105 in FIG. 1, in other examples the wellbore 107 can deviate horizontal, or be curved in at least some portions. The wellbore 107 can be cased, open hole, contain tubing, and can be a variety of shapes or geometries.

A service rig 117, such as a drilling rig, a completion rig, a workover rig, or other mast structure or combination thereof can support a load 113. In the present example, the service rig includes a derrick 119 with a rig floor through which a tubing encased conductor (TEC) 109 extends downward from the service rig 117 into the wellbore 107. In an offshore situation, the service rig 117 can be supported by piers extending downwards to a seabed. Alternatively, the service rig 117 can be supported by columns sitting on hulls or pontoons (or both) that are ballasted below the water surface, which may be referred to as a semi-submersible platform or rig. In an offshore location, tubing may extend from the service rig 117 to exclude seawater and contain drilling fluid returns.

FIG. 1 depicts a servicing vehicle 121 for controlling run-in and withdrawal of the TEC 109 in the wellbore 107. Other mechanical mechanisms for controlling run-in and withdrawal include a draw works that can be coupled to a hoisting apparatus, a slickline unit, or a wireline unit including a winching apparatus, or other such mechanisms. The load 113 can be located in or as part of a sonde, a bottom hole assembly, a completion string, or other downhole tool or apparatus.

In some examples, the wellbore servicing system 101 can include a high-voltage source 103 above a surface 105. The load 113 can be coupled to a high-side power switch 111 that can be positioned downhole in the wellbore 107. The load 113 can be coupled to the high-voltage source 103 by the TEC 109 and may be coupled by the high-side power switch 111. The load 113 may be lowered by a wireline or logging cable into the wellbore 107. Additionally, the load 113 may be coupled to logging tools, such as measure while drilling (MWD) tools, logging while drilling (LWD) tools, or others.

The high-side power switch 111 can isolate the TEC 109 from the load 113. By isolating the TEC 109 from the load 113, the high-side power switch 111 may isolate the high-voltage source 103 from the load 113. Isolating the high-voltage source 103 from the load 113 may prevent electrical fault spreading between one or more electrical devices that may constitute the load 113.

The high-side power switch 111 can include a first transistor and a second transistor. The first transistor and the second transistor can be NMOSs or IGBTs. The first transistor can control a coupled inductor. The coupled inductor can contribute to a voltage sufficient for switching the second transistor. The second transistor can isolate the load 113 from the high-voltage source 103.

Figure 2:
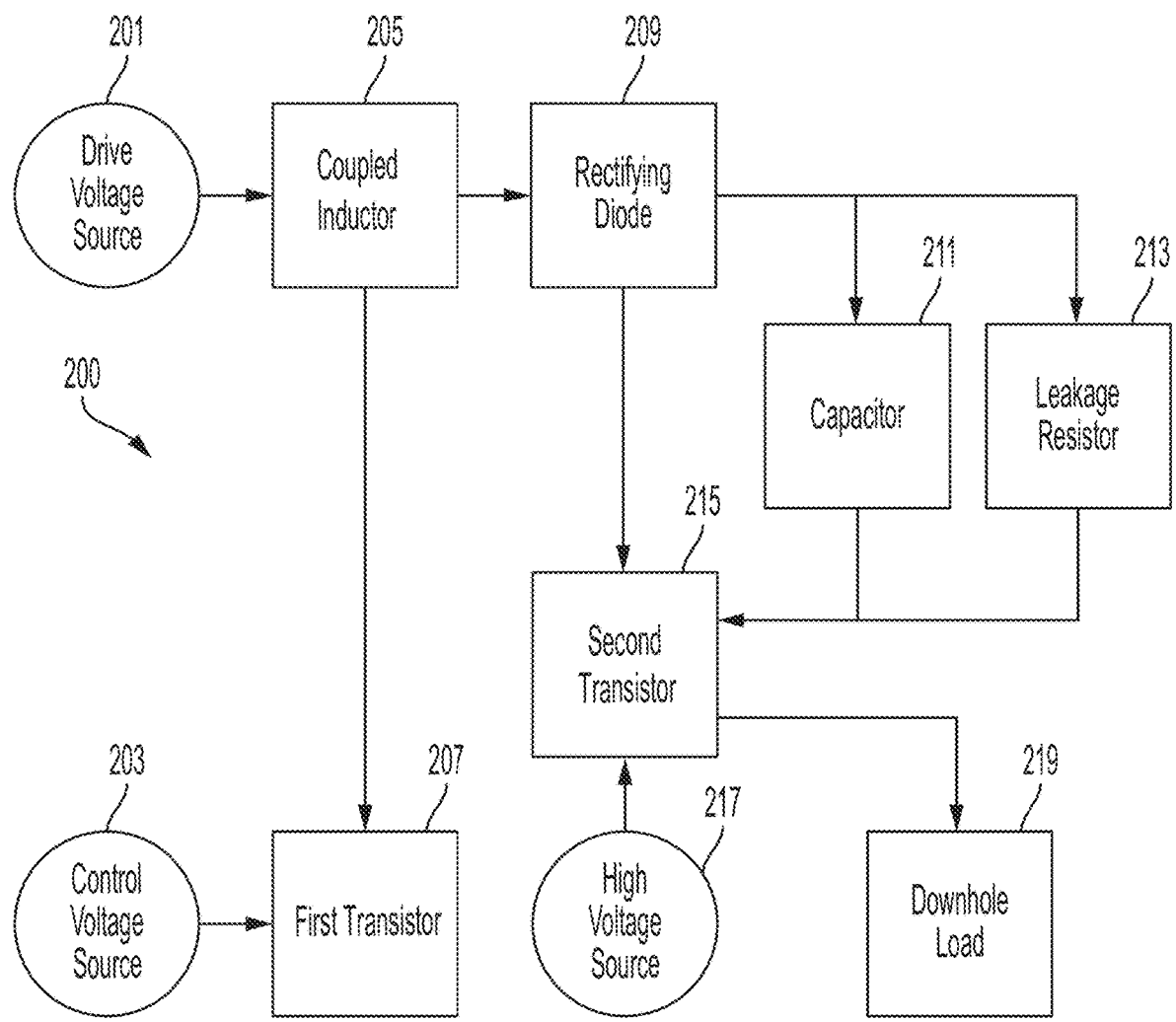
FIG. 2 is a block diagram of a high-side power switch for isolating a load in a wellbore according to one example of the present disclosure.

FIG. 2 is a block diagram of a high-side power switch 200 for isolating a load in a wellbore according to one example of the present disclosure. The high-side power switch 200 can include a control voltage source 203 that can generate a square wave to switch a first transistor 207. Switching the first transistor 207 may draw a drive voltage generated by a drive voltage source 201 through a coupled inductor 205. The coupled inductor 205 may store energy during a high portion of the square wave and release energy during a low portion of the square wave.

In some examples, the high-side power switch 200 can include a rectifying diode 209 positioned between the coupled inductor 205 and a gate of a second transistor 215. The second transistor 215 can operate at a higher voltage than the first transistor 207. The rectifying diode 209 can rectify a voltage output of the coupled inductor 205. The rectifying diode 209 may be part of a half-wave rectifier.

The high-side power switch 200 can include a capacitor 211 positioned between the rectifying diode 209 and a source or emitter of the second transistor 215. The capacitor 211 can filter the rectified voltage from the rectifying diode 209 to generate a filtered voltage. The filtered voltage from the capacitor 211 and the rectified voltage from the rectifying diode 209 may contribute to a switching voltage between the gate and the source or emitter of the second transistor 215. The switching voltage can be a voltage difference between the rectified voltage and the filtered voltage. The switching voltage may be greater than a load voltage that is provided to a downhole load 219 by a high-voltage source 217. The switching voltage can isolate the high-voltage source 217 to the downhole load 219. In addition to the rectified voltage and the filtered voltage, the load voltage may also contribute to the switching voltage.

The high-side power switch 200 can include a leakage resistor 213 positioned in parallel with the capacitor 211. The leakage resistor 213 may discharge the capacitor 211 and the gate of the second transistor 215. The discharging of the capacitor 211 by the leakage resistor 213 may decrease a turn-off time for the second transistor 215.

Figure 3:
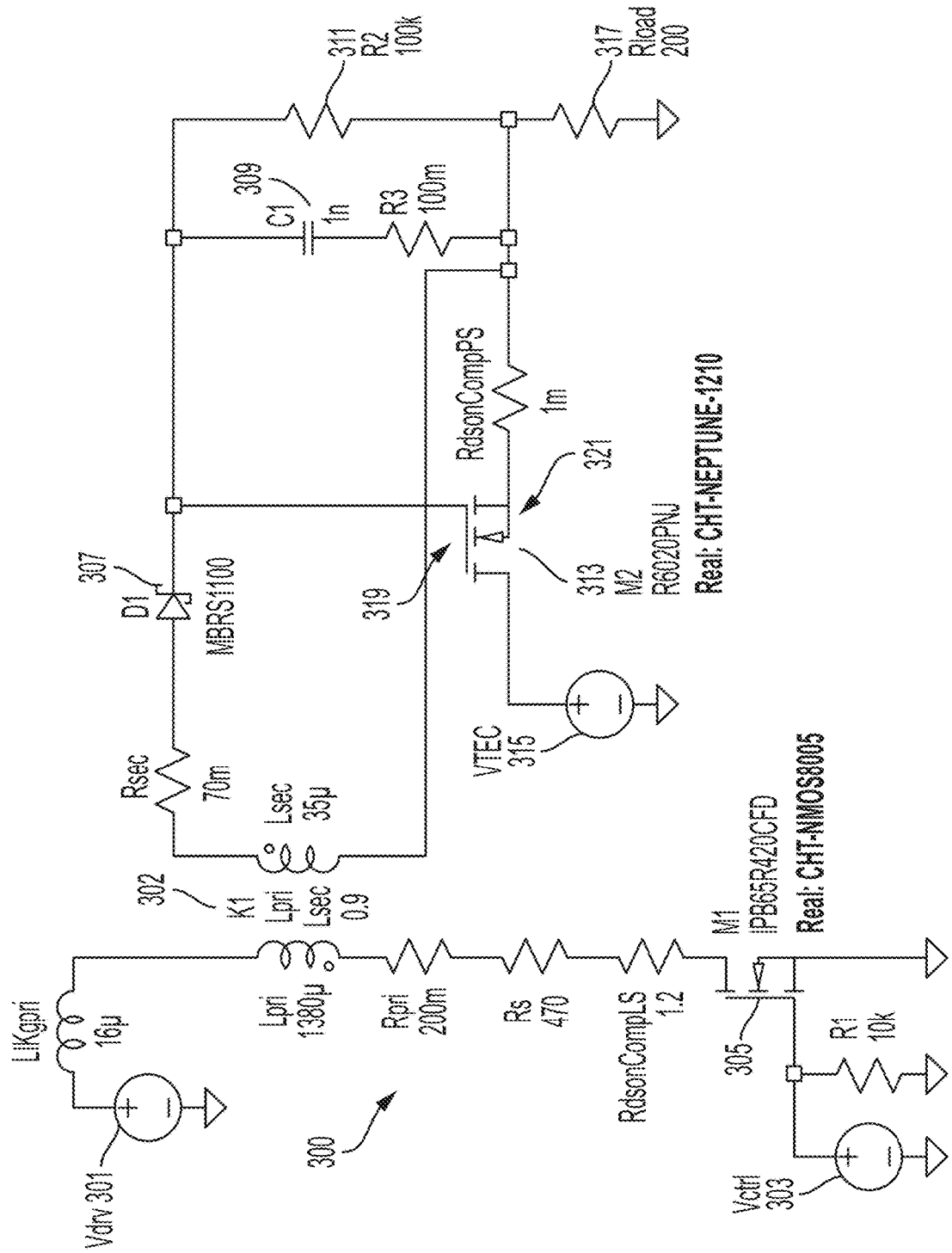
FIG. 3 is a schematic of a high-side power switch for isolating a load in a wellbore according to one example of the present disclosure.

FIG. 3 is a schematic of a high-side power switch 300 according to one example of the present disclosure. The high-side power switch 300 can be a circuit that includes a control voltage source 303. The control voltage source 303 may generate a square wave to switch a first transistor 305. The first transistor 305 can be an NMOS, an IGBT, a BJT, a JFET, or any type of switching device. Switching the first transistor 305 may draw a drive voltage generated by a drive voltage source 301 through a coupled inductor 302. The coupled inductor 302 may be configured to store energy during a high portion of the square wave and release energy during a low portion of the square wave. An example of the coupled inductor 302 can be a transformer.

In some examples, a rectifying diode 307 can be positioned between the coupled inductor 302 and a gate 319 of a second transistor 313. The second transistor 313 can be an NMOS, an IGBT, a JFET cascaded with a switching device, or any type of switching device that can be used as a bypass element. The second transistor 313 can operate at a higher voltage than the first transistor 305. The rectifying diode 307 may be part of a half-wave rectifier that rectifies a voltage output of the coupled inductor 302 to generate a rectified voltage. The rectifying diode 307 can also be coupled to a capacitor 309 that can filter the rectified voltage and generate a filtered voltage.

The capacitor 309 can be coupled to a source or emitter 321 of the second transistor 313. The filtered output of the capacitor 309 and the rectified output of the rectifying diode 307 may contribute to a switching voltage between the gate 319 and the source or emitter 321 of the second transistor 313. The switching voltage can be a voltage difference between the rectified voltage and the filtered voltage. The switching voltage may isolate a high-voltage source 315 to a load 317 that can be positioned downhole in a wellbore. The switching voltage may be greater than a load voltage provided by the high-voltage source 315. The load voltage may additionally contribute to the switching voltage.

The high-side power switch can include a leakage resistor 311 positioned in parallel with the capacitor 309. The leakage resistor 311 may discharge the capacitor 309 and the gate 319 of the second transistor 313. The discharging of the capacitor 309 by the leakage resistor 311 may decrease a turn-off time for the second transistor 313.

Figure 4:
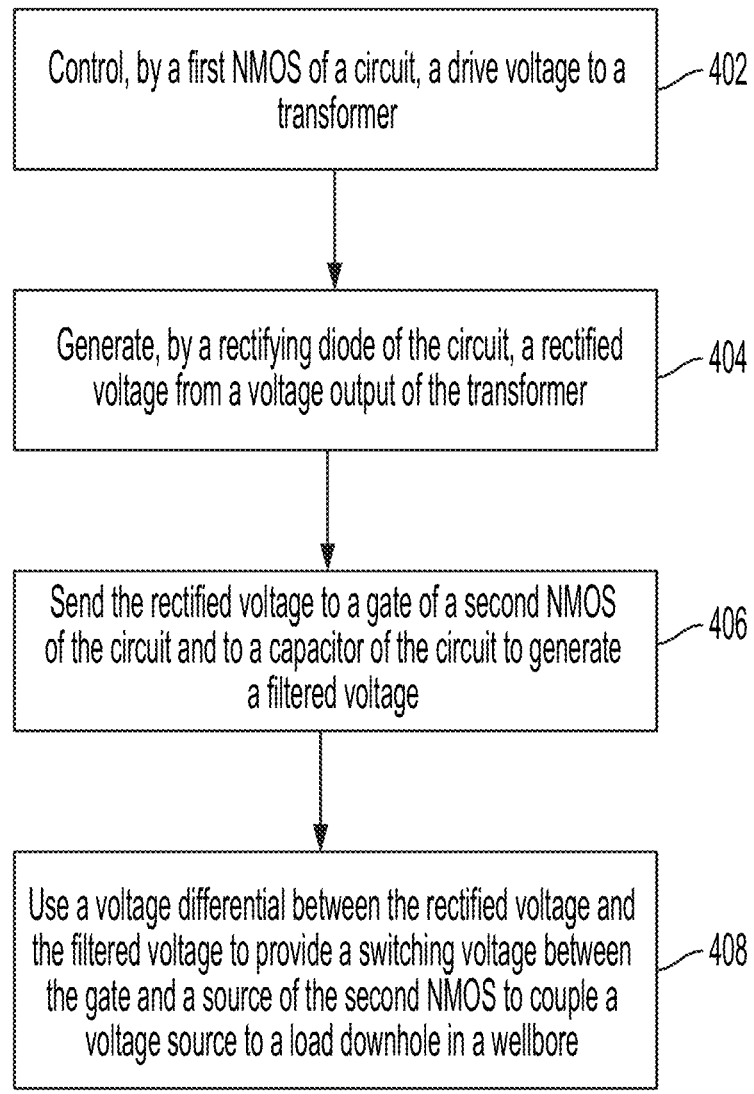
FIG. 4 is a flowchart of a process for isolating a load downhole using a high-side power switch according to one example of the present disclosure.

FIG. 4 is a flowchart of a process for coupling a load downhole to a high-voltage source using a high-side power switch according to one example of the present disclosure. In block 402, a first transistor may control a drive voltage from a drive voltage source to a coupled inductor. A control voltage source may generate a control voltage, such as a square wave, that can cause periodic switching of the first transistor. The switching of the first transistor may draw the drive voltage generated by the drive voltage source through the coupled inductor. As the square wave periodically switches the first transistor, the drive voltage from the drive voltage source can pass through the coupled inductor. The periodic nature of the drive voltage intermittently passing through the coupled inductor may cause the coupled inductor to store energy during a high portion of the square wave and may cause the coupled inductor to release energy during a low portion of the square wave. As a result of the periodic switching, the high-side power switch can be used in high temperature, high pressure downhole environments.

In block 404, a rectifying diode may generate a rectified voltage from a voltage output of the coupled inductor. The rectified voltage generated by the rectifying diode 209 may capture a positive portion of the voltage output of the coupled inductor. As a result, the rectified voltage may be characterized by periods of peak and zero voltage values over time. Because only the positive portion may be captured by the rectifying diode, a mean rectified voltage of the rectifying diode may be lower than a mean voltage output of the coupled inductor.

In block 406, the rectified voltage may be sent to a gate of a second transistor of the high-side power switch and to a capacitor of the circuit to generate a filtered voltage. The second transistor can operate at a higher voltage than the first transistor. The capacitor can filter the rectified voltage to generate the filtered voltage. During a time that a potential of the rectifying diode is higher than a charge across the capacitor, the capacitor may store energy from the coupled inductor. When the rectified voltage of the rectifying diode falls below the charge of the capacitor, the capacitor may discharge energy. When the capacitor is discharged, it may output the filtered voltage.

In block 408, a voltage difference between the filtered voltage and the rectified voltage may be used to provide a switching voltage between the gate and a source or emitter of the second transistor. The switching voltage can switch the second transistor, which may couple the high-voltage source to a load downhole in a wellbore. The switching of the second transistor may involve the switching voltage being higher than a voltage provided by the high-voltage source. In some example, the rectifying diode, the capacitor, and the high-voltage source can be arranged to contribute to the switching voltage of the second transistor. Additional switching of the first transistor can cause the load downhole to return to an isolated state. The switching of the first transistor can stop the square wave from providing a path to ground for the drive voltage source. Discharging of the capacitor can also isolate the load.

Figure 5:
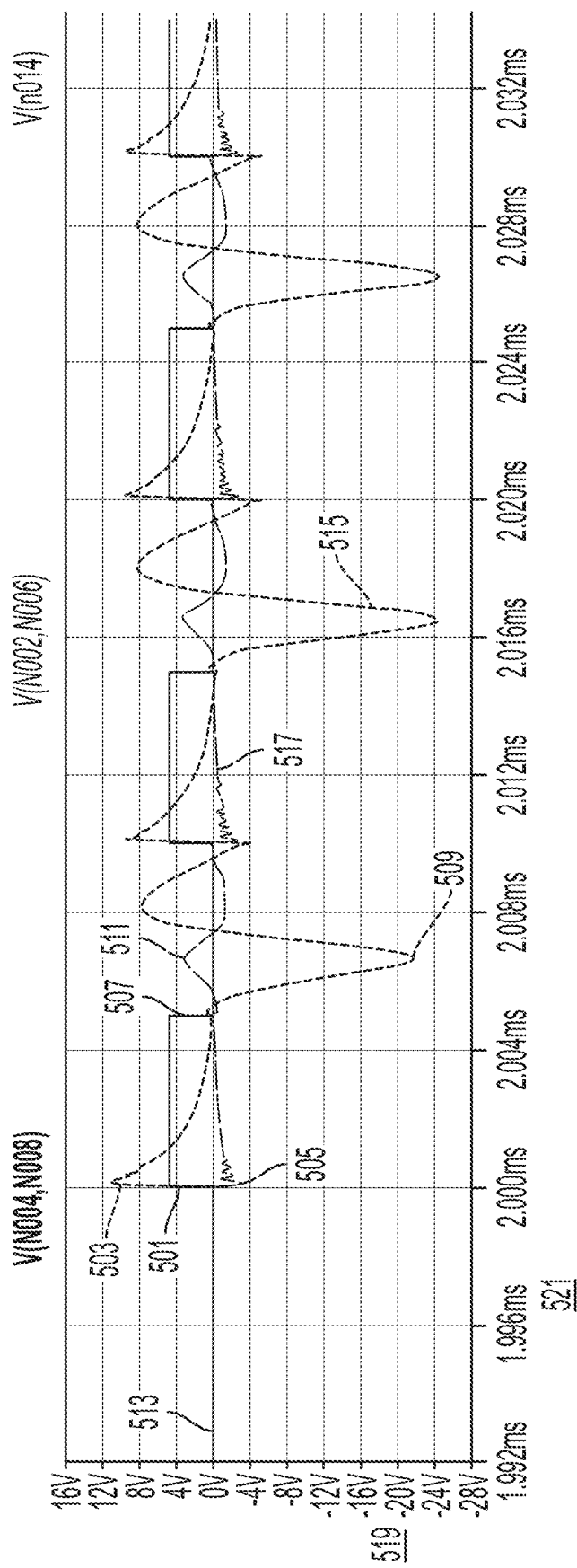
FIG. 5 is a graph depicting a control voltage, a primary-winding voltage, and a secondary-winding voltage according to one example of the present disclosure.

FIG. 5 is a graph depicting a control voltage 513, a primary-winding voltage 515, and a secondary-winding voltage 517 according to one example of the present disclosure. An x-axis 521 represents time and a y-axis 519 represents voltage values. A maximum control voltage 501 of the control voltage 513 is reached at 2.000 ms in FIG. 5, but may be reached at a different time in other examples. The maximum control voltage 501 may cause a first transistor to provide a path to ground to a drive voltage source, such as the drive voltage source 201 in FIG. 2. As a result, a drive voltage from the drive voltage source may flow through a coupled inductor and generate a maximum primary-winding voltage 503. A minimum control voltage 507 may cause the first transistor to remove the path to ground for the drive voltage source. As a result, the coupled inductor may release energy into a secondary winding. A maximum secondary-winding voltage 511 may be reached as a result of the energy transfer from the primary coupled inductor winding to the secondary coupled inductor winding. As a result, a minimum primary-winding voltage 509 may be reached. A minimum secondary-winding voltage 505 of the secondary-winding voltage 517 is illustrated as a negative value, which may not pass through a rectifying diode.

Figure 6:
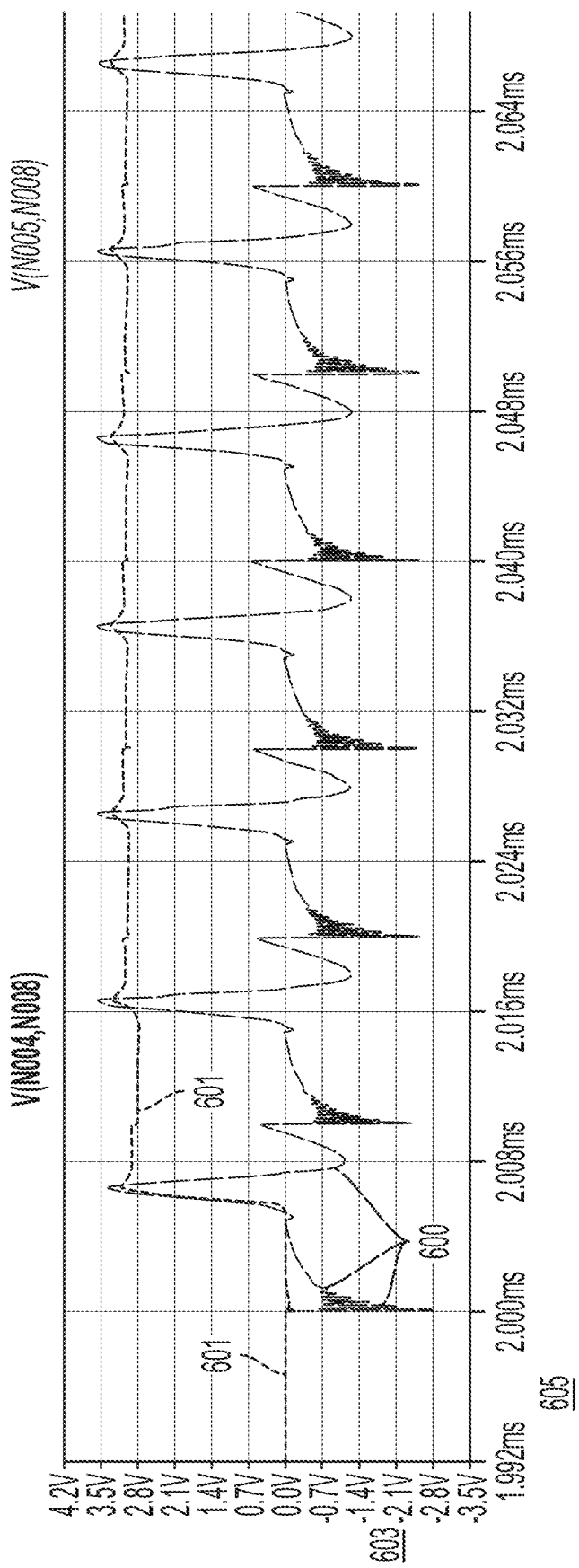
FIG. 6 is a graph depicting a secondary-winding voltage and a filtered voltage according to one example of the present disclosure.

FIG. 6 is a graph depicting a secondary-winding voltage 600 and a filtered voltage 601 according to one example of the present disclosure. An x-axis 605 represents time and a y-axis 603 represents voltage values. As illustrated in FIG. 6, when the secondary-winding voltage 600 is at maximum value, the filtered voltage 601 is at maximum value. As a capacitor that generates the filtered voltage 601 discharges, the filtered voltage 601 may fall slightly. The capacitor may recharge when the secondary-winding voltage 600 is positive. The capacitor 211 may not be drained by negative portions of the secondary-winding voltage 600 because a rectifying diode may prevent such negative portions from reaching the capacitor.

Figure 7:
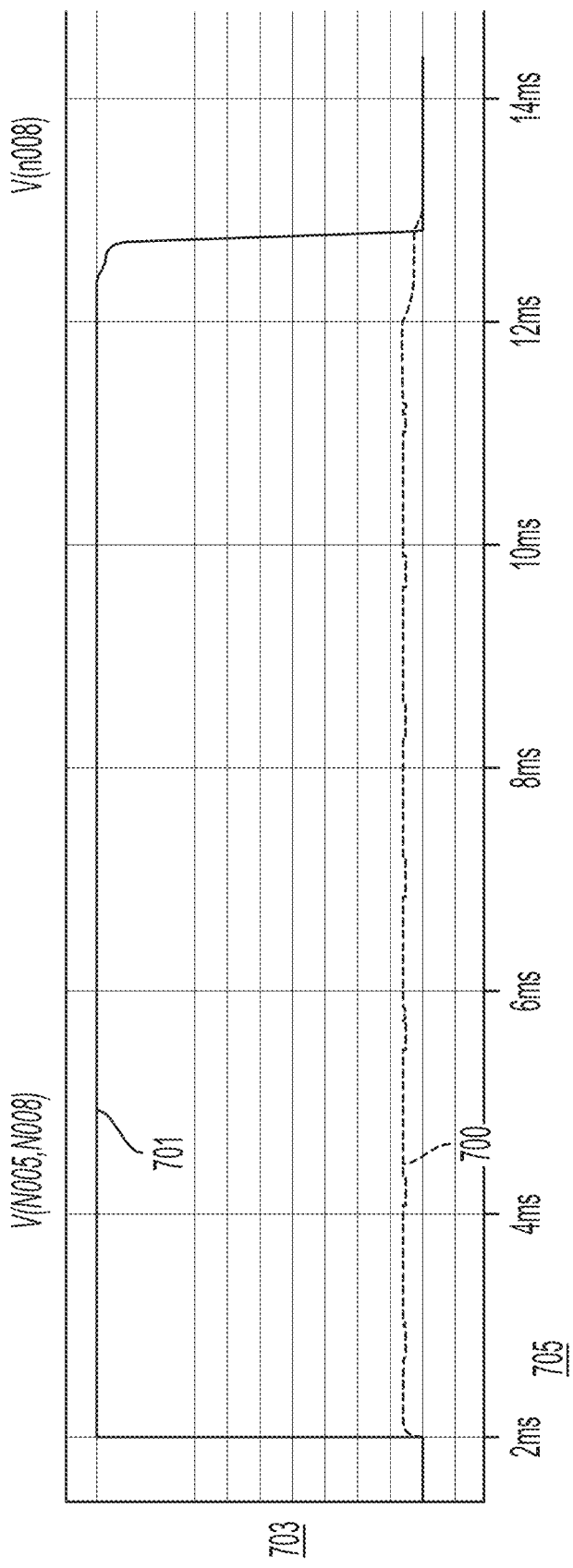
FIG. 7 is a graph depicting a load voltage and a voltage differential between a rectified voltage and a filtered voltage according to one example of the present disclosure.

FIG. 7 is a graph depicting a load voltage 701 and a voltage differential 700 between a rectified voltage and a filtered voltage according to one example of the present disclosure. An x-axis 705 represents time and a y-axis 703 represents voltage values. The voltage differential 700 can be between a gate and a source or emitter of a transistor, such as the second transistor 215 in FIG. 2 or the second transistor 313 in FIG. 3. As the voltage differential 700 increases, the gate of the transistor may close to create a path from a high-voltage source to a downhole load. The load voltage 701 may be a voltage generated by the high-voltage source and provided to the downhole load 219.

In some aspects, systems and a method are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a first transistor configured to provide a drive voltage to a coupled inductor; the coupled inductor configured to receive the drive voltage and generate a voltage output; and a second transistor configured to receive a switching voltage generated from the voltage output to isolate a load positionable downhole in a wellbore from a voltage source.

Example 2 is the system of example 1, further comprising a control voltage source configured to provide a control voltage for controlling the first transistor, the control voltage being a square wave.

Example 3 is the system of example 2, wherein the coupled inductor is configured to store energy during a high portion of the square wave and is configured to release energy during a low portion of the square wave.

Example 4 is the system of examples 1-3, wherein energy is transferred from a primary winding of the coupled inductor to a secondary winding of the coupled inductor subsequent to the first transistor being switched on.

Example 5 is the system of example 1, further comprising a rectifying diode positionable between the coupled inductor and a gate of the second transistor, the rectifying diode being configured to generate a rectified voltage from the voltage output of the coupled inductor.

Example 6 is the system of examples 1-5, further comprising a capacitor positionable between the rectifying diode and a source or an emitter of the second transistor, the capacitor being configured to generate a filtered voltage from the rectified voltage.

Example 7 is the systems of examples 1-6, wherein the capacitor and the rectifying diode are configured to provide the switching voltage between the gate and the source or the emitter of the second transistor.

Example 8 is the systems of examples 1-6, further comprising a leakage resistor configured in parallel with the capacitor to discharge the capacitor and the gate of the second transistor.

Example 9 is the system of example 1, wherein the second transistor is configured to operate at a higher voltage than the first transistor.

Example 10 is a method comprising: controlling, by a first transistor of a circuit, a drive voltage to a coupled inductor; generating, by a rectifying diode of the circuit, a rectified voltage from a voltage output of the coupled inductor; sending the rectified voltage to a gate of a second transistor of the circuit and to a capacitor of the circuit to generate a filtered voltage, the second transistor configured to operate at a higher voltage than the first transistor; and using a voltage differential between the rectified voltage and the filtered voltage to provide a switching voltage between the gate and a source or an emitter of the second transistor to couple a voltage source to a load positionable downhole in a wellbore.

Example 11 is the method of example 10, further comprising providing, by a control voltage source of the circuit, a control voltage for controlling the first transistor, the control voltage being a square wave.

Example 12 is the method of examples 10-11, further comprising: storing, by the coupled inductor, energy during a high portion of the square wave; and releasing, by the coupled inductor, energy during a low portion of the square wave.

Example 13 is the method of example 10, further comprising: filtering, by the capacitor, the rectified voltage from the rectifying diode to generate the filtered voltage.

Example 14 is the method of example 10, wherein the rectified voltage and the filtered voltage comprise the switching voltage between the gate and the source or the emitter of the second transistor.

Example 15 is the method of example 10, further comprising, discharging, by a leakage resistor of the circuit, the capacitor, and the gate of the second transistor.

Example 16 is a system comprising: a load positionable downhole in a wellbore; and a circuit configured to isolate a voltage source to the load, the circuit comprising: a first transistor configured to provide a drive voltage to a coupled inductor; the coupled inductor configured to receive the drive voltage and generate a voltage output; and a second transistor configured to operate at a higher voltage than the first transistor and to receive a switching voltage generated from the voltage output to isolate the voltage source to the load positionable downhole in the wellbore.

Example 17 is the system of example 16, wherein the circuit further comprises a control voltage source for controlling the first transistor.

Example 18 is the system of example 16, further comprising a tubing encapsulated conductor (TEC) cable configured to couple the voltage source to the second transistor.

Example 19 is the system of example 16, wherein the circuit further comprises a rectifying diode positionable between the coupled inductor and a gate of the second transistor, the rectifying diode being configured to generate a rectified voltage from the voltage output of the coupled inductor.

Example 20 is the system of examples 16-19, wherein the circuit further comprises a capacitor positionable between the rectifying diode and a source or an emitter of the second transistor, the capacitor being configured to generate a filtered voltage from the rectified voltage.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    a drive voltage source;
    a control voltage source;
    a high voltage source having a voltage that is higher than a voltage of each of the drive voltage source and the control voltage source;
    a first transistor configured to provide a drive voltage from the drive voltage source to a coupled inductor upon switching of the first transistor by the control voltage source, the coupled inductor configured to receive the drive voltage and to generate a voltage output; and
    a second transistor configured to receive a switching voltage generated from the voltage output, the switching voltage having a higher voltage than the voltage of the high voltage source and usable to isolate the high voltage source from a load positionable downhole in a wellbore by switching the second transistor.

2. The system of claim 1, wherein the control voltage source is configured to provide a control voltage in the form of a square wave.

3. The system of claim 2, wherein the coupled inductor is configured to store energy during a high portion of the square wave and is configured to release energy during a low portion of the square wave.

4. The system of claim 3, wherein energy is transferred from a primary winding of the coupled inductor to a secondary winding of the coupled inductor subsequent to the first transistor being switched on.

5. The system of claim 1, further comprising a rectifying diode positionable between the coupled inductor and a gate of the second transistor, the rectifying diode being configured to generate a rectified voltage that contributes to the switching voltage.

6. The system of claim 5, further comprising a capacitor positionable between the rectifying diode and a source or an emitter of the second transistor, the capacitor being configured to generate from the rectified voltage, a filtered voltage that contributes to the switching voltage.

7. The system of claim 6, wherein the capacitor and the rectifying diode are configured to collectively provide the switching voltage between the gate and the source or the emitter of the second transistor.

8. The system of claim 6, further comprising a leakage resistor configured in parallel with the capacitor to discharge the capacitor and the gate of the second transistor.

9. The system of claim 1, wherein the second transistor is configured to operate at a higher voltage than the first transistor.

10. A method comprising:
providing a high voltage source for powering a load positionable downhole in a wellbore;
controlling supply of a drive voltage from a drive voltage source to a coupled inductor of a circuit by switching a first transistor of the circuit using a control voltage source, the drive voltage source and the control voltage source each having a voltage that is lower than a voltage of the high voltage source;
generating, by a rectifying diode of the circuit, a rectified voltage from a voltage output of the coupled inductor;
sending the rectified voltage to a gate of a second transistor of the circuit and to a capacitor of the circuit to generate a filtered voltage, the second transistor configured to operate at a higher voltage than the first transistor; and
using a voltage differential between the rectified voltage and the filtered voltage to provide a switching voltage between the gate and a source or an emitter of the second transistor, the switching voltage having a higher voltage than the voltage of the high voltage source; and
coupling the high voltage source to the load by switching the second transistor using the switching voltage.

11. The method of claim 10, wherein the control voltage source provides a control voltage in the form of a square wave.

12. The method of claim 11, further comprising:
storing, by the coupled inductor, energy during a high portion of the square wave; and
releasing, by the coupled inductor, energy during a low portion of the square wave.

13. The method of claim 10, further comprising:
filtering, by the capacitor, the rectified voltage from the rectifying diode to generate the filtered voltage.

14. The method of claim 10, wherein the rectified voltage and the filtered voltage comprise the switching voltage between the gate and the source or the emitter of the second transistor.

15. The method of claim 10, further comprising, discharging, by a leakage resistor of the circuit, the capacitor, and the gate of the second transistor.

16. A system comprising:
a load positionable downhole in a wellbore;
a drive voltage source;
a control voltage source;
a high voltage source having a voltage that is higher than a voltage of each of the drive voltage source and the control voltage source;
a circuit configured to isolate the high voltage source from the load, the circuit comprising:
a first transistor configured to provide a drive voltage from the drive voltage source to a coupled inductor upon switching of the first transistor by the control voltage source, the coupled inductor configured to receive the drive voltage and to generate a voltage output; and
a second transistor configured to operate at a higher voltage than the first transistor, the second transistor further configured to receive a switching voltage generated from the voltage output, the switching voltage having a higher voltage than the voltage of the high voltage source and usable to isolate the high voltage source from the load by switching the second transistor.

17. The system of claim 16, wherein the control voltage source is configured to provide a control voltage in the form of a square wave.

18. The system of claim 16, further comprising a tubing encapsulated conductor (TEC) cable configured to couple the high voltage source to the second transistor.

19. The system of claim 16, wherein the circuit further comprises a rectifying diode positionable between the coupled inductor and a gate of the second transistor, the rectifying diode being configured to generate a rectified voltage that contributes to the switching voltage.

20. The system of claim 19, wherein the circuit further comprises a capacitor positionable between the rectifying diode and a source or an emitter of the second transistor, the capacitor being configured to generate from the rectified voltage, a filtered voltage that contributes to the switching voltage.

* * * * *